May 18, 1971 E. BLEIWEISS 3,579,368

SIMULATED SLATE AND METHOD FOR MAKING THE SAME

Filed July 1, 1968

INVENTOR.
EUGENE BLEIWEISS
BY Friedman & Goodman
ATTORNEYS

United States Patent Office 3,579,368
Patented May 18, 1971

---

3,579,368
SIMULATED SLATE AND METHOD FOR MAKING THE SAME
Eugene Bleiweiss, Maywood, N.J., assignor to
Metaframe Corporation
Filed July 1, 1968, Ser. No. 741,487
Int. Cl. C03c 17/00
U.S. Cl. 117—54                                    12 Claims

ABSTRACT OF THE DISCLOSURE

Simulated slate, particularly suitable for use as an aquarium bottom, made by subjecting both sides of a sheet of glass to treatment which will render said sides in a nonsmooth or discontinuous surface, and thence applying an opaque coating to one of the discontinuous surfaces thereof.

BACKGROUND OF THE INVENTION

(1) Field of the invention

This invention relates to a method for producing a simulated slate material and to the simulated slate produced thereby.

(2) Description of the prior art

Slate, is of course, a well known material useful in making garden walks, blackboards and patios. It has also become, during the evolution of the aquarium hobby quite popular as a bottom for an aquarium tank, the sides usually being glass. This popularity arose because slate didn't show scratch marks caused by gravel or other articles resting on the aquarium bottom, and moreover, equally important, historically, slate was cheaper than glass. However, in recent years, with the advent of synthetic materials for black boards and the wide employment of other materials, such as concrete and cement, in the construction field, the demand for slate has diminished greatly. As a result of this diminished demand, investment in slate quarries has fallen off considerably and thus, the sources of supply have likewise fallen off.

While ordinary glass can be, and is, used in making aquarium bottoms, it is not as widely accepted by the aquarium hobbyist, as slate has been heretofore. There are several reasons for this; (1) slate was traditionally used, (2) glass appears to be excessively fragile, (3) glass is easily scratched because of the silica grit used in aquarium bottoms.

This is not to say, however, that slate does not have its own disadvantages. One disadvantage is that slate, because of its calcium carbonate and silica content has a powdery surface, and does not allow for the adherence of aquarium mastics thereto, when the slate bottom is to be secured in place in the aquarium tank. This powdery surface is caused by the milling steps of cutting, polishing, and grinding. Another disadvantage is that slate being a natural material, even with relatively efficient production techniques, makes it exceedingly difficult to produce, economically, perfectly flat pieces. Still another disadvantage to slate is the existence of cracks that run along its natural cleavage lines.

Since it is necessary to have an aquarium bottom which is completely flat and warp-free, under the great pressures exerted at the very bottom of the aquarium, and since the material making up the bottom must be completely water-retentive, it can be seen by the foregoing that slate doesn't provide all the answers either.

Conventional, ordinary glass is, of course, the best material to use for an aquarium bottom, since it has none of the disadvantages of slate, but unfortunately, ordinary glass doesn't look like slate.

SUMMARY OF THE INVENTION

It is, therefore, among one of the principal objectives of the invention to provide a simulated slat, without the attendant prior art disadvantages of natural slate.

In accord with the present invention, there is now provided a simulated slate, particularly suitable for use as an aquarium bottom, comprising a sheet of glass whose opposing flat faces have been suitably treated to provide a nonsmooth or discontinuous surface thereto and an opaque coating applied to one of the nonsmooth surfaces.

BRIEF DESCRIPTION OF THE DRAWING

The invention will be hereinafter more fully described with reference to the accompanying drawing, in which.

DESCRIPTION OF THE PREFERRED EMBODIMENTS

Figure 1:
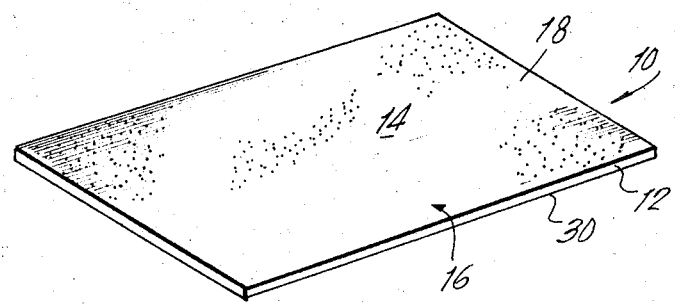
FIG. 1 is a view in perspective of a sheet of simulated slate made according to the invention.
Figure 4:
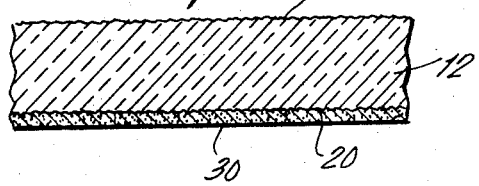
FIG. 4 is a fragmented sectional magnified view of the simulated slate bottom taken within the circle area of FIG. 3.

Referring now to the figures of the invention, FIG. 1 depicts a sheet of simulated slate 10, made according to the method of the invention. The sheet of simulated slate 10 further comprises a sheet of glass 12 having a pair of parallel, opposing flat faces 14 and 16, as in a sheet of conventional glass. However, in contra-distinction to a sheet of conventional glass, flat faces 14 and 16 have been rendered nonsmooth, or craglike, to form nonsmooth surfaces 18 and 20, respectively (FIGS. 1 and 4).

Faces 14 and 16 are rendered nonsmooth by subjecting both smooth, flat faces to a suitable treatment, which may include sandblasting, etching, grinding, or the like, sufficient to eliminate the former smooth surfaces so that the flat surfaces of the glass are now resultingly discontinuous, so to speak, or craglike. In other words, the surfaces of the glass are now the exact opposite of the euphonism "smooth as glass," forming now a multiplicity of "teeth," so to speak on the former smooth surface. The sandblasting, etching, grinding techniques are conventional and need not be further described herein, the invention residing elsewhere, as will be apparent.

After the sandblasting treatment, according to a specific embodiment of the invention, forming nonsmooth surfaces 18 and 20, a layer of opaque coating 30 is applied uniformly to one of the surfaces, which for sake of convenience, is chosen as surface 20. Coating 30 is preferably a thin layer, and is applied by spraying, as by conventional pressurized means, or by roller-coating. Coating 30 is preferably an asphaltic, however, it may also be any suitable paint, in any color, so long as it is opaque when applied. The striking result is that the coated, sandblasted glass now resembles a piece of natural slate. Thus, there is obtained a material which has all the advantages of glass, yet resembles slate in appearance, and moreover, the slate will come in various colors, depending on the color of the opaque coating applied.

Still further advantages flow from the sandblasting treatment. It had previously been a serious problem to get any kind of intermediate coating to adhere to ordinary glass, but no the nonsmooth, sandblasted surface allows the asphaltic coating to "bite" into the glass and adhere quite strongly thereto.

Figure 2:
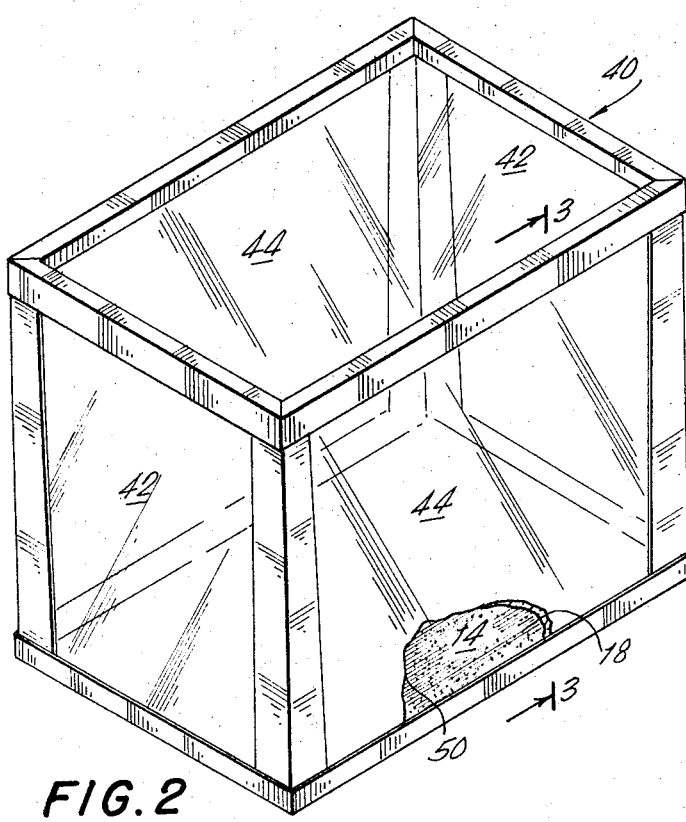
FIG. 2 is a view in perspective of an aquarium tank containing a bottom made of the simulated slate of the invention.
Figure 3:
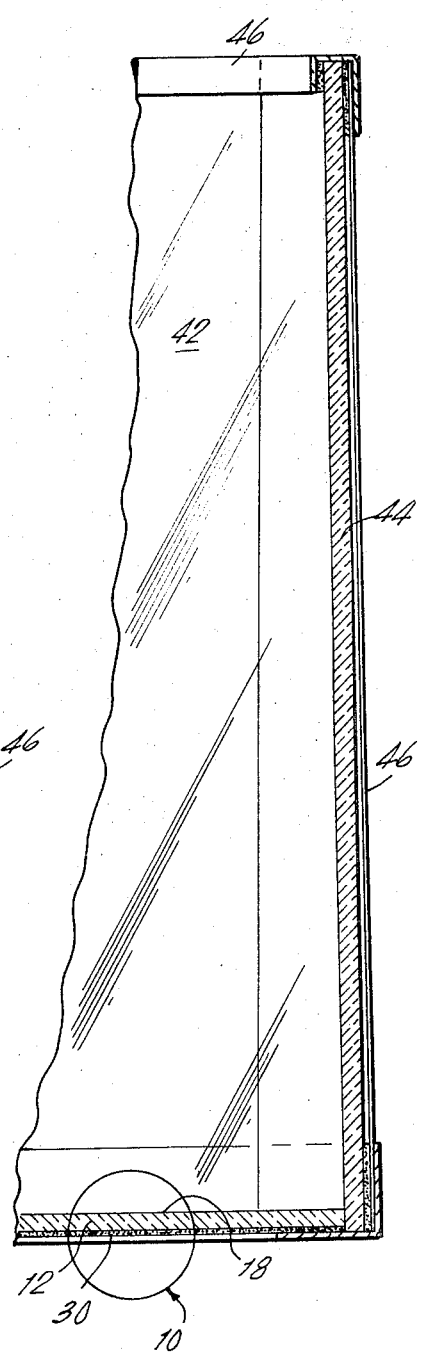
FIG. 3 is a sectional view taken along line 3—3 of FIG. 2.

FIGS. 2 and 3 illustrate a particularly preferred use of the invention simulated slate, and that is an aquarium bottom. Therein, there is shown an aquarium tank 40 assembled by conventional means and having opposing, parallel vertical glass walls 42 and 44, respectively, the walls being secured to the metal frame 46 of the tank 40 at their respective end portions by means of an aquarium cement or mastic. While glass walls 42 and 44 are conventional clear glass, the aquarium bottom 50 is a sheet of the simulated slate 10 of the invention, asphaltic-coated side down, appropriately sized to fit into the bottom of the aquarium tank. The sandblasted glass is, of course, no longer clear, but, rather, translucent. A mastic is applied to the edges of the "slate" 10, on its asphaltic coated side, in order to secure it to the metal frame 46. Thus, there is provided an aquarium tank having the conventional glass walls and the highly desirable "slate" bottom. Furthermore, the "teeth" on the surfaces tend to negate the force of the water in the tank against the glass side walls, thereby assuring a tight seal between side walls and aquarium bottoms.

Other advantages flow from the operation of the invention, and that is when the sandblasted glass with the asphaltic coating is applied to the aquarium mastic, the mastic in turn not only keys itself to the intermediary coating, but into the sandblasted surface, which is still accessible after the thin asphaltic coating is applied. The sandblasting also affords a surface which, when magnified, tends to not only conceal scratches, but prevents the growth of scratches, since it is a discontinuous surface. When a piece of gravel is rubbed across the surface, rather than cutting a clean line, which may tend to fracture, it actually abrades only the peaks of the ground surface, and the scratch, therefore, is not a continuous one, thereby preserving the nonscratched appearance of the glass, since the "valleys" of the scratches are broken up. Since glass is a highly manufactured commodity, it can be made within desired dimensional tolerances and thicknesses. Any quantity that is needed can easily be processed, without the problems existent in producing natural slate materials that vary in their composition.

What is claimed is:

1. A simulated slate bottom for an aquarium tank, said bottom comprising a translucent sheet of glass provided with a pair of opposing surfaces, each of said surfaces being nonsmooth to define a craglike face on opposite sides of said glass sheet, one of said surfaces defining an inner wall of said aquarium with the other of said surfaces defining an outer wall of said aquarium, and opaque coating means applied uniformly over the entire surface of said outer wall so that said bottom resembles slate in appearance when viewed from said inner wall of said aquarium.

2. A slate bottom according to claim 1, wherein said coating means is in a thin layer.

3. A slate bottom according to claim 1 wherein said coating means is an asphaltic.

4. A slate bottom according to claim 1 wherein said coating means is a paint.

5. A slate bottom according to claim 1, wherein mastic means are applied to edges of said bottom on said coated outer wall to secure said bottom to said aquarium tank.

6. A method of making a simulated slate bottom for an aquarium tank, said method comprising roughening a pair of opposing, smooth, flat surfaces of a clear sheet of glass to form nonsmooth, craglike surfaces on opposite sides of said glass sheet wherein said glass sheet is resultingly rendered translucent, applying an opaque coating to only one of said craglike surfaces wherein said coating is uniformly applied over the entire face of said one coated surface, and positioning said glass sheet in said aquarium tank with said one coated surface forming an outer wall and the other surface forming an inner wall so that said bottom resembles slate in appearance when viewed from said inner wall of said aquarium.

7. A method according to claim 6, wherein said roughening comprises sandblasting.

8. A method according to claim 7, wherein said coating is applied by spraying.

9. A method according to claim 7, wherein said coating is applied by means of a roller.

10. A method according to claim 6 wherein said roughening comprises etching.

11. A method according to claim 6 wherein said roughening comprises grinding.

12. A method according to claim 6, including applying mastic means to edges of said bottom on said one coated surface, and securing said bottom to said aquarium tank using said applied mastic means.

References Cited

UNITED STATES PATENTS

| | | | |
|---|---|---|---|
| 1,001,775 | 8/1911 | Schambony | 117—54X |
| 2,340,918 | 2/1944 | Wright | 117—124(D)X |
| 2,536,183 | 1/1951 | Jamieson | 117—54X |
| 2,615,270 | 10/1952 | Adler | 117—124(D)X |

FOREIGN PATENTS

| | | | |
|---|---|---|---|
| 684,910 | 12/1952 | Great Britain | 117—54 |

RALPH S. KENDALL, Primary Examiner

C. WESTON, Assistant Examiner

U.S. Cl. X.R.

119—5; 51—319; 117—123